(12) United States Patent
Seok et al.

(10) Patent No.: US 8,462,806 B2
(45) Date of Patent: Jun. 11, 2013

(54) PATH SELECTION PROCEDURE IN MESH NETWORK AND FORMAT OF PATH REQUEST FRAME THEREFOR

(75) Inventors: Yong Ho Seok, Anyang-si (KR); Alexander A. Safonov, Anyang-si (KR)

(73) Assignee: LG Electronics Inc., Seoul (KR)

( * ) Notice: Subject to any disclaimer, the term of this patent is extended or adjusted under 35 U.S.C. 154(b) by 244 days.

(21) Appl. No.: 12/919,123

(22) PCT Filed: Feb. 24, 2009

(86) PCT No.: PCT/KR2009/000865
§ 371 (c)(1),
(2), (4) Date: Aug. 24, 2010

(87) PCT Pub. No.: WO2009/107962
PCT Pub. Date: Sep. 3, 2009

(65) Prior Publication Data
US 2011/0019686 A1 Jan. 27, 2011

(30) Foreign Application Priority Data
Feb. 25, 2008 (KR) .................. 10-2008-0016684

(51) Int. Cl.
*H04L 12/54* (2006.01)
(52) U.S. Cl.
USPC ........................................................ 370/428
(58) Field of Classification Search
USPC ........................................................ 370/428
See application file for complete search history.

(56) References Cited

U.S. PATENT DOCUMENTS

| | | | |
|---|---|---|---|
| 7,159,035 B2 * | 1/2007 | Garcia-Luna-Aceves et al. | 709/241 |
| 8,014,329 B2 * | 9/2011 | Gong | 370/311 |
| 2005/0111428 A1 * | 5/2005 | Orlik et al. | 370/344 |
| 2006/0039298 A1 * | 2/2006 | Zuniga et al. | 370/252 |
| 2007/0248065 A1 * | 10/2007 | Banerjea et al. | 370/338 |
| 2007/0263647 A1 * | 11/2007 | Shorty et al. | 370/406 |
| 2008/0010385 A1 * | 1/2008 | Lee et al. | 709/241 |
| 2008/0075029 A1 * | 3/2008 | Song | 370/311 |

OTHER PUBLICATIONS

"Proposed Routing for IEEE 802.11s WLAN Mesh Networks" The 2nd Annual International Wireless Internet Conference Aug. 2-5, 2006 Boston MA ACM 1-59593-514—Feb. 6, 2008.*
"Proposed Routing for IEE 802.11s WLAN Mesh Networks" The 2nd Annual International Wireless Internet Confernce Aug. 2-5, 2006 Bostom MA ACM 1-59593-514—Feb. 6, 2008.*

* cited by examiner

*Primary Examiner* — Mark Rinehart
*Assistant Examiner* — Kenneth P Hunt
(74) *Attorney, Agent, or Firm* — Birch, Stewart, Kolasch & Birch, LLP

(57) ABSTRACT

A method for selecting a transmission path from a source mesh point (MP) to a destination MP in a mesh network is provided. The source MP broadcasts a frame comprising a path request (PREQ) element. According to a power management state of an intermediate MP that receives the frame, the PREQ element comprises power management mode consideration information for controlling forwarding the received PREQ element for the destination MP. A transmission delay due to delay of data requested to be transmitted in real time at the MP operating in the PSM can be prevented.

7 Claims, 3 Drawing Sheets

Fig. 1
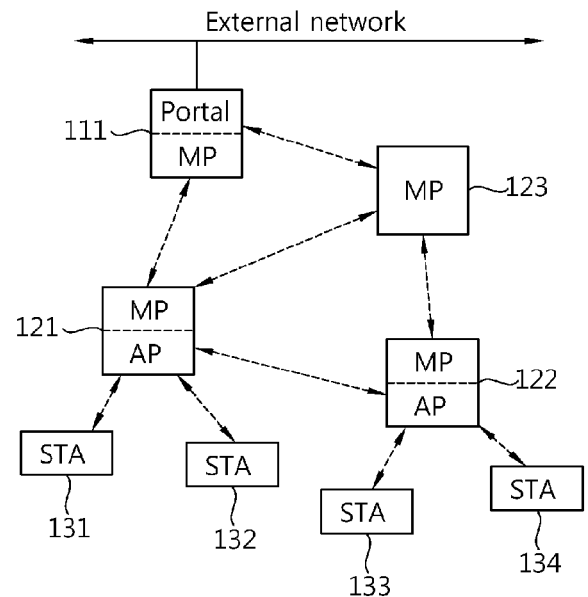
Fig. 2
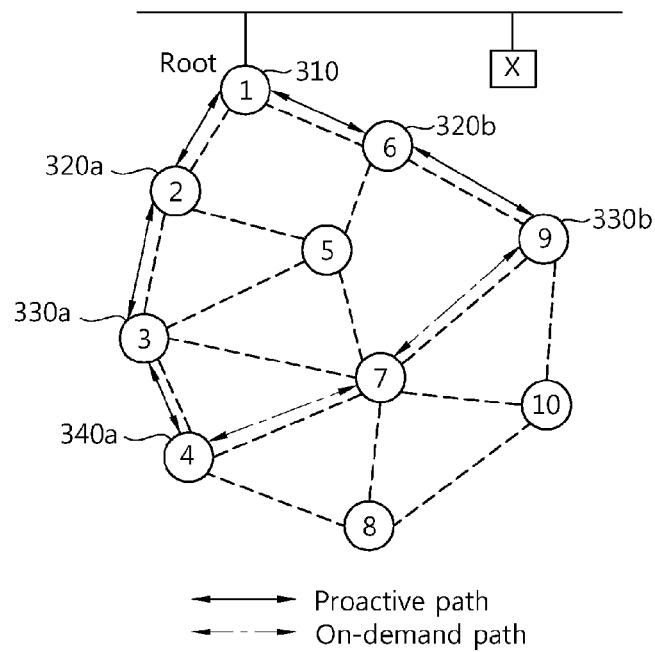
Fig. 3
| Category | Action Value | Path Request Element |

Fig. 4

| Octets:1 | 1 | 1 | 1 | 1 | 4 | 6 | 4 | 0 or 6 | 4 |
|---|---|---|---|---|---|---|---|---|---|
| Element ID | Length | Flags | Hop-count | Time to Live | PREQ ID | Originator Address | Originator Sequence Number | Proxied Address | Lifetime |

| 4 | 1 | 1 | 6 | 4 | ... | 1 | 6 | 4 |
|---|---|---|---|---|---|---|---|---|
| Metric | Destination Count | Per Destination Flags #1 | Destination Address #1 | Destination Seq. Num. #1 | ... | Per Destination Flags #N | Destination Address #N | Destination Seq. Num. #N |

Fig. 5

| B0 | B1 | B2 | B3      B7 |
|---|---|---|---|
| DO | RF | AO | Reserved |
| Bits: 1 | 1 | 1 | 5 |

Fig. 6

| Category | Action Value | Path Reply Element |
|---|---|---|

Fig. 7

| Octets:1 | 1 | 1 | 1 | 1 | 6 | 6 | 0 or 6 | 4 |
|---|---|---|---|---|---|---|---|---|
| ID | Length | Flags | Hopcount | Time to Live | Destination Address | Destination Seq. Num. | Destination Proxied Address | Lifetime |

| 4 | 6 | 4 |
|---|---|---|
| Metric | Originator Address #1 | Originator Seq. Num. |

PATH SELECTION PROCEDURE IN MESH NETWORK AND FORMAT OF PATH REQUEST FRAME THEREFOR

TECHNICAL FIELD

The present invention relates to a wireless local access network (WLAN) and, more particularly, to a path selection procedure in a mesh network and a format of a path request frame for the path selection procedure.

BACKGROUND ART

Recently, diverse wireless communication technologies are under development in line with the advancement of information communication technology. Among them, a wireless local area network (WLAN) is a technique allowing mobile terminals such as personal digital assistants (PDAs), lap top computers, mobile multimedia players (PMPs), and the like, to wirelessly access the high speed Internet at homes or offices or in a particular service providing area based on a radio frequency technology.

A wireless mesh network may be a network supporting direct communications between a plurality of wireless devices, i.e., mesh points (MPs) having a function of relaying, without going through an access point (AP). From the point of view of the function, a distribution system (DS) connecting the AP may be substituted by an inter-operable wireless links between MPs or multi-hop paths between a plurality of MPs. The mesh network allows one MP to establish a peer-to-peer wireless link with neighboring MPs, having an advantage of enabling more flexible wireless connections.

In the mesh network, one wireless device may be connected to a plurality of wireless devices, establishing a plurality of communication paths. Such communication paths between the wireless devices are called as wireless mesh links or simply mesh links or peer links. The wireless devices are called as the MPs but not limited thereto. Among the MPs, an MP that performs an AP function in addition to its relay function is called as a mesh access point (MAP).

The mesh network has advantages of flexibility in network establishment, reliability according to a detour path, and reduction in power consumption resulting from the reduction in a communication distance. Specifically, using the mesh network enables MPs to establish a flexible network therebetween even in an area with no established communication network. In addition, in the mesh network, a plurality of detour paths can be secured as the plurality of MPs are connected to each other, so even if one MP has a trouble, data can be transmitted via a different path. Also, although a communication coverage of one MP is not large, communication can be made by way of an adjacent MP, allowing performing of long distance communication even at a low power level.

A hybrid wireless mesh protocol (HWMP) is one of path selection protocols used in the mesh network. The HWMP is a protocol obtained by combining flexibility in selecting an on-demand path with a proactive topology tree extension. The proactive element and a reactive element combined in the HWMP allow an optimum and effective path selection in significantly diverse types of mesh networks.

The HWMP uses the same protocol primitive, generation and processing rules as those adopted for an ad hoc on-demand distance vector (AODV) protocol. Such HWMP supports two operation modes based on its configuration: an on-demand mode and a proactive tree building mode. The two operation modes are not exclusive but may be used together.

Meanwhile, the MPs constituting the mesh network may operate in one of the two power management modes, respectively. The two power management modes refer to an active mode (AM), a complete power state, and a power save mode (PSM) in which the transmission or receipt of data frame is not allowed and waiting in the least power state. Aside from an MP operating in the AM, in case an MP operating in the PSM receives a data frame to be relayed, the MP cannot transmit the data frame immediately because of the operation characteristics of the PSM, resulting in a high possibility of inevitably generating a transmission delay of a certain time.

DISCLOSURE OF INVENTION

Technical Problem

When an intermediate MP operates in the AM at a transmission path from a source MP to a destination MP in the mesh network employing the HWMP, a possibility of causing a transmission delay in relaying a data frame for the destination MP is low. However, if the intermediate MP operates in the PSM, an end-to-end transmission delay would occur due to the intermediate MP.

In general, various types of data are transmitted, so real time characteristics required for data to be transmitted from the source MP to the destination MP varies according to types of data. Namely, voice data for a voice call or the like requires considerable real time characteristics, while document data, storage data, or the like, does not have a problem although there occurs a transmission delay of a certain time. Thus, whether or not the MP, namely, the intermediate MP, located at the transmission path operates in the PSM or AM needs to be considered when the source MP selects a transmission path to the destination MP in the mesh network.

Therefore, an object of the present invention is to provide a path selection procedure allowing selection of a transmission path in consideration of whether or not an intermediate MP located at a transmission path from a source MP to a destination MP operates in a PSM or AM in a mesh network.

Another object of the present invention is to provide a format of a path request information element (PREQ IE) supporting a path selection procedure allowing selection of a transmission path in consideration of whether or not an intermediate MP located at a transmission path from a source MP to a destination MP operates in a PSM or AM in a mesh network.

Technical Solution

According to an aspect of the invention, there is provided a method for selecting a transmission path from a source mesh point (MP) to a destination MP in a mesh network, wherein the source MP broadcasts a frame comprising a path request (PREQ) element, and according to a power management state of an intermediate MP that receives the frame, the PREQ element comprises power management mode consideration information for controlling forwarding the received PREQ element for the destination MP.

According to another aspect of the invention, there is provided a method for selecting a transmission path from a source mesh point (MP) to a destination MP in a mesh network, wherein the source MP broadcasts a frame comprising a path request (PREQ) element retaining power management mode consideration information, and an intermediate MP that receives the frame broadcasted and operates in a power save mode (PSM) forwards the PREQ element for the destination MP only when allowed by the power management mode consideration information included in the received frame.

According to still another aspect of the invention, there is provided a format of a path request (PREQ) element transmitted by a source mesh point (MP) to discover one or more destination MPs, wherein the PREQ element comprises a Per Destination Flags field for limiting conditions for selecting a path from the source MP to the destination MPs, and the Per Destination Flags field comprises a power management mode consideration flag for an intermediate MP, which receives the PREQ element, to control forwarding the received PREQ element according to the power management mode of the intermediate MP.

Advantageous Effects

According to the embodiment of the present invention, a source MP, which intends to establish a transmission path to a destination MP by way of one or more intermediate MPs in a wireless mesh network, can specify whether an intermediate MP should operate in an AM or may operate in PSM in the process of establishing the transmission path. Thus, the source MP can include only those MPs operating in the AM as intermediate MPs, while preventing an MP operating in the PSM as an intermediate MP, at the established transmission path, and a transmission delay due to delay of data requested to be transmitted in real time at the MP operating in the PSM can be prevented.

BRIEF DESCRIPTION OF DRAWINGS

FIG. 1 is a block diagram showing an example of a configuration of a wireless mesh network.

FIG. 2 illustrates proactive tree paths and on-demand paths in the wireless mesh network.

FIG. 3 is a block diagram showing the format of a frame body of a path request frame according to an embodiment of the present invention.

FIG. 4 is a block diagram showing the format of a path request element according to an embodiment of the present invention.

FIG. 5 is a block diagram showing an example of the format of a destination flag according to an embodiment of the present invention.

FIG. 6 is a block diagram showing the format of a frame body of a path response frame according to an embodiment of the present invention.

FIG. 7 is a block diagram showing the format of a path response element according to an embodiment of the present invention.

MODE FOR THE INVENTION

FIG. 1 is a block diagram showing an example of a configuration of a wireless mesh network. The wireless mesh network has a unique mesh identifier, which is used to identify a group of mesh points (MPs) constituting the wireless mesh network. How to assign the mesh identifier is not limited.

With reference to FIG. 1, the wireless mesh network includes one or more stations STAs 131, 132, 133, and 134 and one or more wireless devices, namely, MPs 111, 121, 122, and 123. Among the MPs, the MPs 121 and 122 have the stations STAs 131, 132, 133, and 134 connected thereto, so the corresponding MPs 121 and 122 are MPs, namely, MAPs, that also perform the function of an access point (AP). The MP 111 is connected with an external network through a fixed line or wirelessly, which is called a mesh portal.

The stations STAs 131 to 134, certain function mediums including a medium access control (MAC) following the stipulation of IEEE 802.11 standard and a physical layer interface with respect to a wireless medium, are non-AP stations. Such stations may be referred to by other names such as wireless transmit/receive unit (WTRU), user equipment (UE), mobile station (MS), mobile subscriber unit, and the like, than the name of wireless station.

The MPs 111, 121, 122, and 123 are entities constituting the wireless mesh network, and those of function entities of IEEE 802.11 including a MAC following the stipulation of IEEE802.11 standard and a physical layer interface. The MPs 111, 121, 122, and 123 are wireless devices supporting mesh services, which include general services allowing the MPs constituting the mesh network to communicate directly with each other. Two MPs, e.g., MPs 121 and 123 providing the mesh services communicate via a mesh link or a peer link, a direct link established between the two MPs.

In order for two or more MPs to establish a peer link to form the mesh network or in order for another MP to participate in the established mesh network, mesh profiles should be identical between the MPs establishing the peer link. The MPs, supporting at least one mesh profile, includes a mesh ID, a path selection protocol identifier, and a path selection metric identifier. In addition, the mesh profile may further include a congestion control mode identifier and the like.

As mentioned above, the MP that additionally performs the function of AP among the MPs is particularly called as the MAP. Thus, the MAPs 121 and 122 perform the function of AP for an associated station set and connected to themselves in addition to the function of the MPs as described above. The AP may be also called by other names such as centralized controller, base station (BS), node-B, a site controller, and the like, than the AP.

A message transmission path between the MPs in the wireless mesh network will now be described. As stated above, the HWMP is one of path selection protocols that can be used in the wireless mesh network. The HWMP is a path selection protocol obtained by combining the flexibility of an on-demand path selection to a systematic proactive path, allowing selection of an optimum and effective path in various types of mesh networks.

The HWMP supports operations of two modes according to its configuration: an on-demand mode and a proactive tree building mode. In the on-demand mode, the MPs can communicate by using a peer-to-peer path. This mode is generally used in a configuration without a root MP, but even with the root MP, if a better path is provided, the on-demand mode may be used. According to the proactive tree building mode, a path is established by using a frame to which the root MP is periodically broadcast, e.g., a proactive path request frame (PREQ), or a root announcement (RANN) frame. Hereinafter, the paths selected according to the on-demand mode and the proactive tree building mode are called as an on-demand path and a proactive path, respectively.

The proactive path has a structure in which message transmission paths diverge in a chain manner like branches of a tree, from the root MP as a starting point. In this structure, the message transmission paths between MPs are periodically set according to a parent-child relation. The parent-child relation is the path of a tree-like shape in which the plurality of MPs are successively continued in the order of grand parent-parent-child-grand child from the root MP as a starting point There is no particular restriction in setting the proactive path, and for example, a proactive PREQ mechanism or a RAAN mechanism may be used.

Meanwhile, the on-demand path is a transmission path arbitrarily set between the MPs as necessary. In establishing the on-demand path, for example, an ad hoc on-demand distance vector (AODV) protocol may be used. The on-demand path does not need to go through the root MP, and for example, the shortest path or a path with the best link metric characteristics between the source MP and the destination MP may be selected at the corresponding time point.

According to the HWMP, the proactive tree building mode and the on-demand mode are not exclusive to each other, so the proactive path and the on-demand path may be combined to be used. For example, a data frame first transmitted by the source MP to the destination MP may be transmitted along the proactive path. In this case, the data frame is transmitted from the source MP to the root MP along an upward path of the proactive path, and data is transmitted from the root MP to the destination MP along a downward path of the proactive path. And then, after the destination MP finds the on-demand path toward the source MP, it may transmit other data frame through the on-demand path.

FIG. 2 illustrates proactive tree paths and on-demand paths in the wireless mesh network, specifically showing the proactive paths and the on-demand paths from MP④ to MP⑨.

With reference to FIG. 2, the proactive path from MP④ to MP⑨ includes an 'upward path' continued from MP④ to MP①, the root MP, via MP③ and MP② and a 'downward path' continued from MP①, the root MP, to MP⑨ via MP⑥. Here, the upward path means the path from the child MP to the mother MP (e.g., from MP④ to MP③, from MP③ to MP②, and from MP② to MP①) having the root MP as an end point. The downward path means the path from the mother MP to the child MP (e.g., from MP① to MP⑥, and from MP⑥ to MP⑨) having the root MP as a start point.

The on-demand path from MP④ to MP⑨ may be, for example, a path from the MP④ to MP⑨ via MP⑦. In this on-demand transmission path, MP④ is a source MP, MP⑨ is a destination MP, and MP⑦ is an intermediate MP. Such path is one of temporarily established paths for a message transmission from MP④ to MP⑨ or from MP⑨ to MP④.

A path selection procedure according to an embodiment of the present invention will now be described. The path selection procedure according to an embodiment of the present invention additionally includes 'power management mode consideration information' for controlling forwarding of a path request element PREQ in the intermediate MP in a path request information element PREQ IE of a path request frame transmitted for a path selection. The 'power management mode consideration information' is information regarding whether to allow or limit a relay of the PREQ IE of a received path request frame according to whether an intermediate MP which has received the path request frame operates in the AM or PSM. Using the 'power management mode consideration information', all the selected path may be constituted with MPs in AM.

These 'power management mode consideration information' may be effective for the PREQ element transmitted according to the on-demand path selection mode, and in the proactive tree building mode, although it is included in the format of the PREQ element, it may not actually perform any function due to restrictions (e.g., a DO flag of the PREQ element is set as '1' or it is included in a PREQ element transmitted as unicast as in an embodiment to be described) in other conditions. But the present invention is not meant to be limited thereto and any other conditions may be also used.

The source MP intending to search for a path to the destination MP by using the on-demand path selection mode first broadcasts a PREQ element with a specified destination MP. The source MP is an initiator or an initiation MP initiating the on-demand path selection procedure. The destination MP may be specified in a list of the destination MPs of the PREQ element. The PREQ element includes a metric field initialized as an initial value of an active path selection metric. In the embodiment of the present invention, the path request element includes the power management mode consideration information (to be described).

The PREQ element may be transmitted by being included in a path request frame or may be transmitted by being included in a management frame. The PREQ element may be also transmitted in the form of unicast or broadcast to a neighbor peer MP. The unicast PREQ means a PREQ element included in a management frame unicast to a neighbor peer MP. The broadcast MP means a PREQ element included in a management frame broadcast to all the neighbor peer MPs.

FIG. 3 is a block diagram showing the format of a frame body of a path request frame, one of frames in which the PREQ element including the power management mode consideration information may be included according to an embodiment of the present invention. With reference to FIG. 3, the frame body of the path request frame includes a category field, an action value field, and a path request element. The category field is set by a category value indicating a mesh path selection. The action value field is set by a value indicating a path request action.

The path request element is used to discover a path to one or more destination MPs or construct a proactive (reverse) path selection tree to the root MP. The path request element may be also used to check a path to a destination MP. FIG. 4 illustrates an example of the format of the path request element. With reference to FIG. 4, the path request element includes an Element ID field, Length field, Flags field, Destination Count field, N number of Per Destination Flags field #1 to #N, N number of Destination Address #1 to #N, and N number of Destination Seq. Num. #1 to #N. Wherein the Per Destination Flags, Destination Address, and Destination Seq. Num. form a set, respectively.

The Element ID field is set by a value indicating a path request information element. The Length field may be set by a value indicating the length of the path request element as illustrated in FIG. 4, e.g., a value indicating the length of 37 octets to 255 octets. The Flags field may be a bit field and indicates the characteristics of the path request information such as whether or not it performs the function or a portal, whether it is a group address or an individual address, whether or not it is a proactive PREQ, and the like.

A Hop-count field is set as an arbitrary integer indicating the number of hops from the initiator of the path request information to an MP to which the request is transmitted. A Time to Live field is set as an arbitrary integer indicating the maximum number of hops allowed for the path request information. A PREQ ID field is set by an arbitrary integer indicating a unique ID for identifying the path request information. An Originator Address is set by a value indicating a MAC address of the path request information. An Originator Sequence Number is set by an arbitrary integer indicating a sequence number unique to the initiator.

A Proxied Address field is for a MAC address of a proxied entity and used when a frame is received from the exterior of a mesh and a source of the frame is a proxied entity. The Proxied Address field exists only when an AE flag is set as 1. A Lifetime field is set by an arbitrary integer value indicating time during which an MP that receives the PREQ considers that forwarding of the information is valid. A Metric field is set by an arbitrary integer value indicating an accumulated metric from an initiator to an MP that transmits the PREQ. A Destination Count field is set by an arbitrary integer value indicating the number of destination MPs including the path request element. If the value of the destination count field is N, the path request element includes N number of per destination flag fields #1 to #N, N number of destination addresses #1 to #N, and N number of Destination Seq. Num. #1 to #N.

A Per Destination Flags is for describe conditions of a path selection for a destination MP. FIG. 5 is a block diagram showing an example of the format of a destination flag field according to an embodiment of the present invention. With reference to FIG. 5, the Per Destination Flags field includes a destination only (DO) flag, a reply-and-forward (RF) flag, and an active only (AO) flag, an example of power management mode consideration information.

The DO flag indicates whether or not transmission of a path reply (PREP) to a source MP is allowed when an intermediate MP that has received the PREQ knows a path toward a destination MP, and its format may be a bit field. For example, when the DO bit field is set as '0', the intermediate MP that knows an active path toward the corresponding destination MP is allowed to reply with a unicast PREP to the received PREQ. Meanwhile, if the DO bit field is set as '1', only the destination MP is allowed to reply with the unicast PREP and the intermediate MP is not allowed to reply with the unicast PREP.

The RF flag is to control forwarding of the PREQ at the intermediate MP, which may be a bit field used when the intermediate MP is allowed to transmit the PREP by the DO flag (for example, when the DO bit field is set as '0'). For example, when the RF bit field is set as '0', the DO flag is set as '0', and although the intermediate MP knows the active path for the destination MP, the intermediate MP is not allowed to transfer or forward the PREQ for the destination MP. Meanwhile, when the RF bit field is set as '1', the intermediate MP is allowed to transfer or forward the PREQ for the destination MP. However, when the DO bit field is set as '1', the value of the RF flag does not affect forwarding of the PREQ element.

The AO flag is to control forwarding of the PREQ element at the intermediate MP, which indicates whether or not forwarding of a received PREQ is allowed according to a power management mode of the intermediate MP. As discussed above, the AO flag is an example of power management mode consideration information. There is no particular limitation in the format of the AO flag, but it may be a bit field. For example, when the AO bit field is set as '0', the intermediate MP that knows the active path toward the corresponding destination MP is allowed to forward received PREQ for the destination MP regardless of its power management mode, namely, although it is in the PSM. Meanwhile, if the AO bit field is set as '1', the intermediate MP is allowed to forward the received PREQ element for the destination MP only when the intermediate MP is in the AM. That is, if the intermediate MP is in the PMS, it is not allowed to forward the PREQ element. The MP that forwards the PREQ element with the AO bit field set as '1' maintains the AM until when a life time of the PREQ element expires. However, when the DO bit field is set as '1', the value of the AO flag does not affect forwarding of the PREQ element at the intermediate MP.

When the AO flag is in use, the source MP may specify the AO flag as a certain value to limit conditions for the power management mode of intermediate MPs. Namely, the source MP may select whether to allow including the MP operating in the PSM as an intermediate MP of the frame transmission path. For example, if the source MP wants to find only the intermediate MPs all operating in the AM at the path toward the destination MP, for example, when a transmission delay by an intermediate MP is prevented because a real time transmission is requested, the source MP may set the AO flag as '1' and broadcast the PREQ element. Meanwhile, if the source MP does not care whether the intermediate MPs at the path toward the destination MP operates in the AM or PSM (e.g., it is determined that real time transmission is not so much necessary, etc.), the source MP may set the AO flag as '0' and broadcast the PREQ element.

The AO flag according to the embodiment of the present invention exemplarily shows the method considering the power management mode of the intermediate MPs in selecting a transmission path. Thus, the AO flag may be modified into various other methods or other names so as to be used. For example, the name called a power-save (PA) allowed flag, not the AO flag, may be used such that the PA flag allows replying with the PREP even when the intermediate MP is in the PSM, or differently from the embodiment of the present invention, a power-save only (PO) flag may be used to allow replying with the PREP only when the intermediate MP is in the PSM. According to one aspect of the present invention, two bits may be allocated as the power management (PM) flag to allow PREP reply only when the intermediate MP is in the AM, allow PREP reply only when the intermediate MP is in the PSM, or allow the PREP reply regardless of the AM or PSM. In this case, the 2-bit AO flag may be suitably allocated.

With reference to FIG. 4, a MAC address of the destination MP is set in the Destination Address field. An arbitrary integer indicating a sequence number to the destination MP which has been most recently received from an initiator is set in the Destination Sequence Number field.

The operation in the on-demand path selection mode will now be described. When the intermediate MP receives the PREQ element, if the intermediate MP generates a path to the source MP, if the received PREQ element has a larger sequence number, or if the PREQ element provides a better metric than the current path although the sequence number is the same as that of the current path, the intermediate MP updates the path to the source MP. If a new path is generated or if the current path is corrected, the PREQ element is forwarded or re-broadcast. Each MP may receive a plurality of the same PREQ elements initiated from the source MP, and the plurality of PREQ elements may hold information, respectively, for setting a unique path from the source MP to the intermediate MP.

Each time the intermediate MP forwards the PREQ element, the metric field included in the PREQ element is updated by reflecting a cumulative metric of the path to the source MP of the PREQ element. After the destination MP generates the path to the source MP or after the destination MP performs updating, it transmits the unicast PREP element to the source MP.

FIG. 6 is a block diagram showing the information included in a frame body of a path reply frame that may include the PREP element according to an embodiment of the present invention. The path reply element is a frame transmitted to the source MP by the destination MP to determine a path between the destination MP and the source MP using the HWMP protocol, or a frame the intermediate MP transmits to the source MP when certain conditions are met. With reference to FIG. 6, the frame body of the path reply frame includes a Category field, an Action Value field, and a Path Reply (PREP) element. The Category field is set by a category value indicating a mesh path selection. The Action Value field is set by a value indicating a path reply action.

The PREP element may be used to set a forward path to the destination MP and check that the destination MP can be reached. FIG. 7 shows an example of the format of the PREP element. With reference to FIG. 7, the PREP element includes an Element ID field, a Length field, a Flags field, a Hopcount field, a Time to Live field, a Destination Address or Destination MP address field, a Destination Seq. Num. field, a Destination Proxied Address field, a Lifetime field, a Metric field, an Originator Address #1, and an Originator Seq. Num. field.

The element ID field is set by a value indicating a path reply information element. The Length field may be set by a value indicating the length of the PREP element as shown in FIG. 6, e.g., the length of 32 octets to 255 octets. The Flags field may be a bit field, which represents the characteristics such as whether or not a proxied address exists, or the like. The Hopcount field is set by an arbitrary integer indicating the number of hops from the destination MP to a corresponding intermediate MP (local MP). The Time to Live field is set by an arbitrary integer indicating the maximum number of hops allowed over the path reply information.

A MAC address of the destination MP is set in the Destination Address or Destination MP address field, and the Destination Seq. Num. field is set as a DSN of a target of the PREQ element. The Destination Proxied Address field is set by a value indicating a proxied address of a device to which the PREP element is transmitted, and the Lifetime field is set by a value reflecting a life time of the PREQ element, an object of reply of the PREP element. The Metric field is set by an arbitrary integer value indicating a cumulative metric from the destination MP to the corresponding intermediate MP (local MP). The Originator Address #1 field is set by a value indicating a MAC address of an originator, and the Originator Seq. Num. is set by an arbitrary integer indicating a unique sequence number to the PREQ element.

The operation in the on-demand path selection mode will now be described. The intermediate MPs generate paths to the destination MP immediately when they receive the PREP, and forward the received PREP to the source MP. Upon receiving the PREP, the source MP generates a path to the destination MP. If the destination MP receives a different PREQ with a better metric, it updates the path to the source MP to a new path and transmits a new PREP to the source MP together with the updated path. Through this process, the bi-directional end-to-end path with the best metric is established between the source MP and the destination MP.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

The invention claimed is:

1. A method for selecting a transmission path from a source mesh point (MP) to a destination MP in a mesh network,
   wherein the source MP broadcasts a frame comprising a path request (PREQ) element, and according to a power management state of an intermediate MP that receives the frame, the PREQ element comprises power management mode consideration information for controlling forwarding of the received PREQ element for the destination MP,
   wherein the PREQ element comprises a Per Destination Flags field,
   wherein the Per Destination Flags field comprises a destination only (DO) flag, a replay-and-forward (RF) flag, and an active only (AO) flag,
   wherein the DO flag indicates whether or not transmission of a path reply to the source MP is allowed,
   wherein the RF flag is used to control a forwarding of the PREQ at the intermediate MP,
   wherein the AO flag is used to control a forwarding of the PREQ element at the intermediate MP, and
   wherein the power management mode consideration information is associated with the AO flag included in the Per Destination Flags field comprised in the PREQ element.

2. The method of claim 1, wherein the power management mode consideration information allows the forwarding of the received PREQ element only when the power management mode of the intermediate MP is an active mode.

3. The method of claim 1, wherein the AO flag is valid only when the DO flag is set as '0'.

4. The method of claim 1, wherein the intermediate MP that receives and forwards the PREQ element with the AO flag set as '1' is waiting in the active mode until a life time of the PREQ element expires.

5. A method for selecting a transmission path from a source mesh point (MP) to a destination MP in a mesh network,
   wherein the source MP broadcasts a frame comprising a path request (PREQ) element retaining power management mode consideration information, and an intermediate MP that receives the frame broadcasted, operates in a power save mode (PSM), and forwards the PREQ element for the destination MP only when allowed by the power management mode consideration information included in the received frame,
   wherein the PREQ element comprises a Per Destination Flags field,
   wherein the Per Destination Flags field comprises a destination only (DO) flag, a replay-and-forward (RF) flag, and an active only (AO) flag,
   wherein the DO flag indicates whether or not transmission of a path reply to the source MP is allowed,
   wherein the RF flag is used to control a forwarding of the PREQ at the intermediate MP,
   wherein the AO flag is used to control a forwarding of the PREQ element at the intermediate MP, and
   wherein the power management mode consideration information is associated with the AO flag included in the Per Destination Flags field comprised in the PREQ element.

6. The method of claim 5, wherein the AO flag is valid only when the DO flag is set as '0'.

7. The method of claim 5, wherein when the intermediate MP receives the PREQ element with the RF flag set as '1', the intermediate MP forwards the received PREQ element for the destination MP.

* * * * *